United States Patent [19]
Sasaki et al.

[11] Patent Number: 5,107,423
[45] Date of Patent: Apr. 21, 1992

[54] DOCUMENT PROCESSING DEVICE WITH MERGE FUNCTION

[75] Inventors: Ryoichi Sasaki, Nagoya; Tokiko Majima, Toyohashi, both of Japan

[73] Assignee: Brother Kogyo Kabushiki Kaisha, Nagoya, Japan

[21] Appl. No.: 324,301

[22] Filed: Mar. 15, 1989

[30] Foreign Application Priority Data

| Mar. 26, 1988 | [JP] | Japan | 63-72257 |
| Jul. 15, 1988 | [JP] | Japan | 63-177561 |
| Jul. 18, 1988 | [JP] | Japan | 63-178462 |
| Jul. 18, 1988 | [JP] | Japan | 63-178463 |

[51] Int. Cl.$^5$ .......................... G06F 15/20
[52] U.S. Cl. ...................... 364/419; 395/117; 395/146
[58] Field of Search .............. 364/419, 200, 900

[56] References Cited

U.S. PATENT DOCUMENTS 4,064,557  12/1977  Bluethman et al. ............ 364/900

FOREIGN PATENT DOCUMENTS 51-40416  11/1976  Japan.

*Primary Examiner*—Gail O. Hayes
*Attorney, Agent, or Firm*—Kane, Dalsimer, Sullivan, Kurucz, Levy, Eisele and Richard

[57] ABSTRACT

In a document processing device with the merge-print function, merge print select control processing for selecting the data record unit to be merge-printed is employed. Furthermore merge data change control processing for deleting and adding a memory space for an additional data record unit is employed. The memory space is provided at a position specified by the cursor in the merge data memory. Thereby, it becomes easy to edit merge file and prepare a plurality of merge-printed document inserted different merge data set.

15 Claims, 16 Drawing Sheets

F I G. 4

| IDENTIFIER MEMORY AREA | UNIT NO. MEMORY AREA | NUMBER MEMORY AREA | MERGE SYMBOL (M1) | MERGE DATA 1 | MERGE SYMBOL (M2) | MERGE DATA 2 | MERGE SYMBOL (M3) | MERGE DATA 3 |

HIGHER-DIGIT  LOWER-DIGIT

HIGHER-DIGIT  LOWER-DIGIT

HIGHER-DIGIT  LOWER-DIGIT

HIGHER-DIGIT  LOWER-DIGIT

HIGHER-DIGIT  LOWER-DIGIT

HIGHER-DIGIT  LOWER-DIGIT

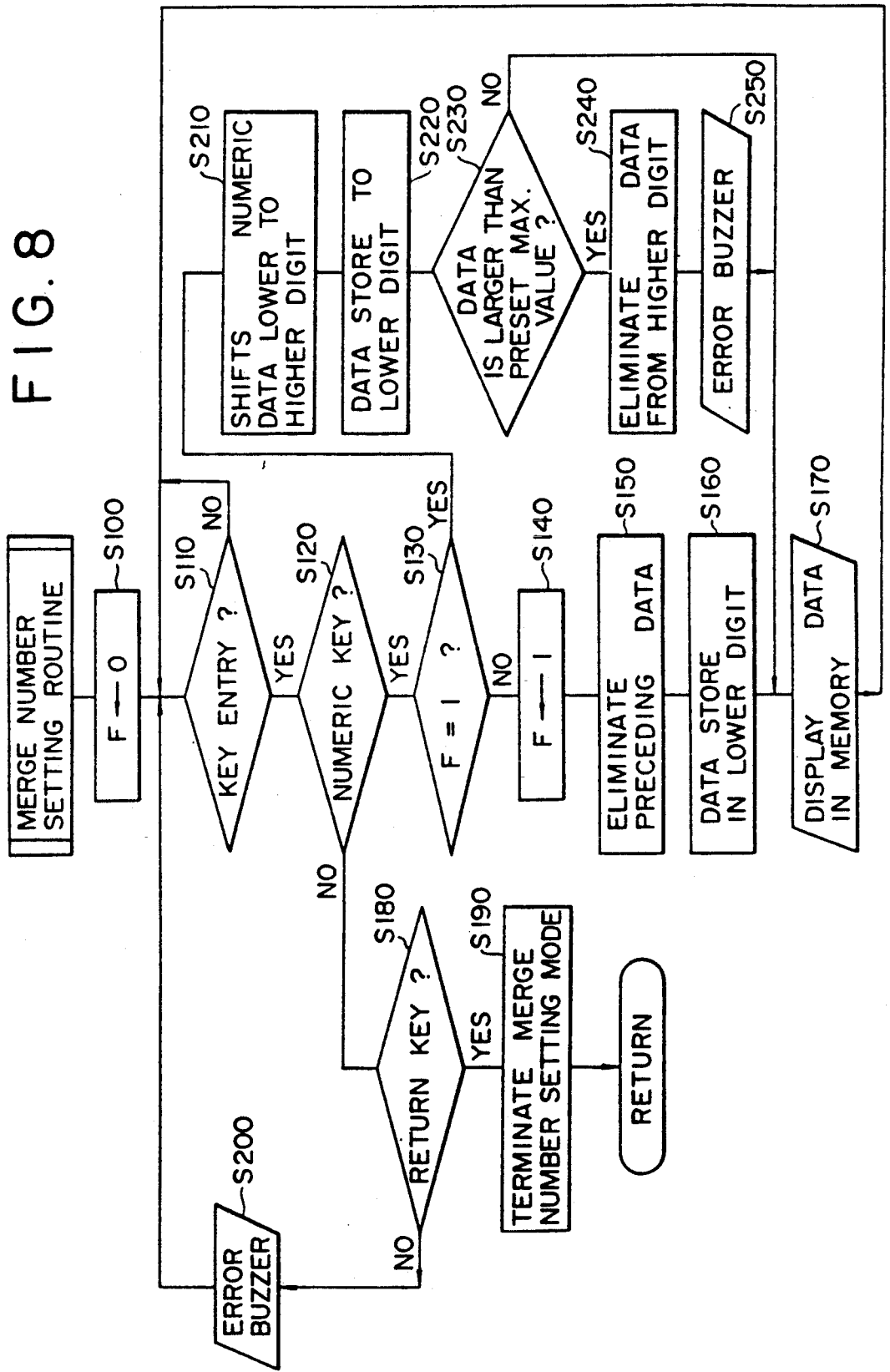

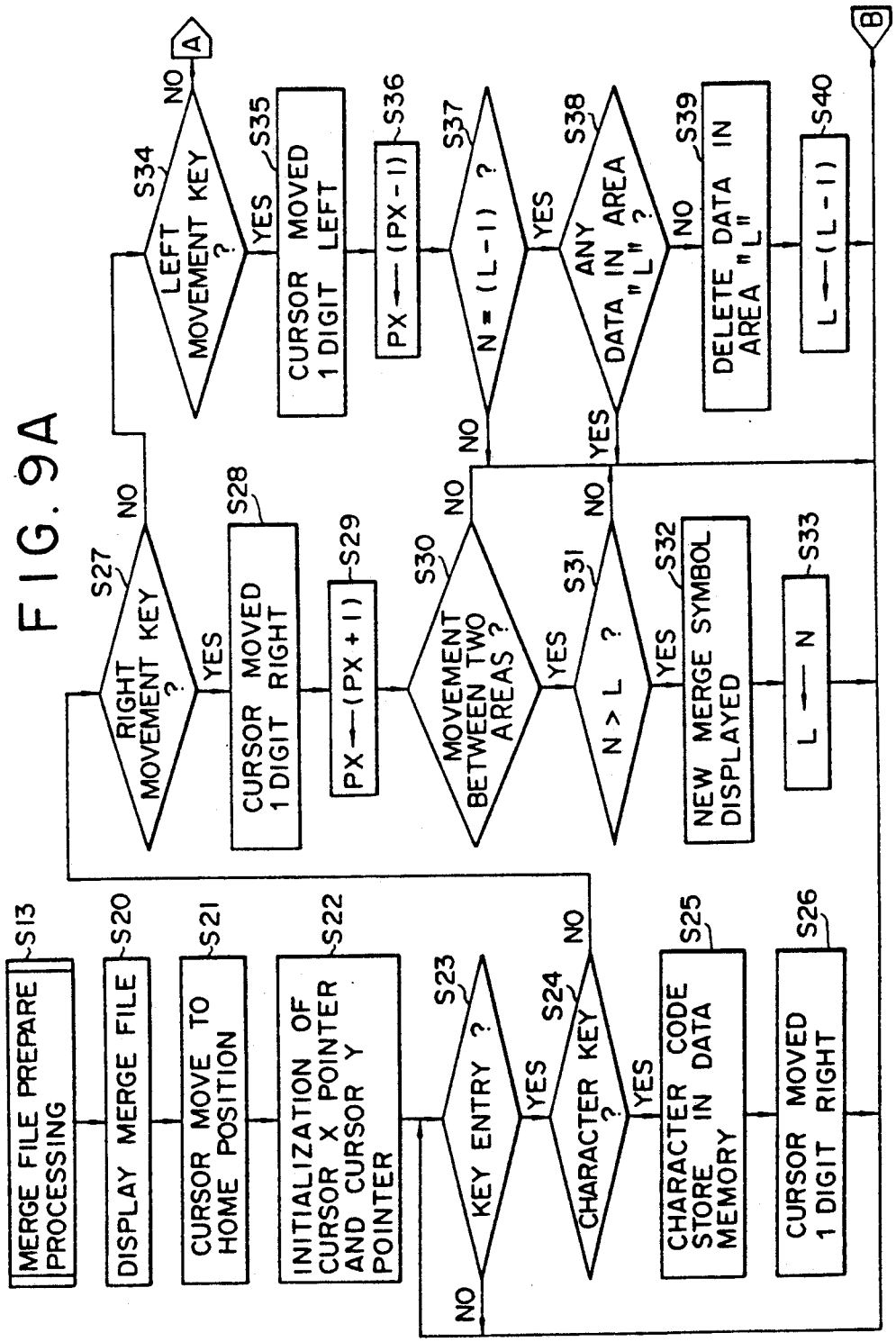

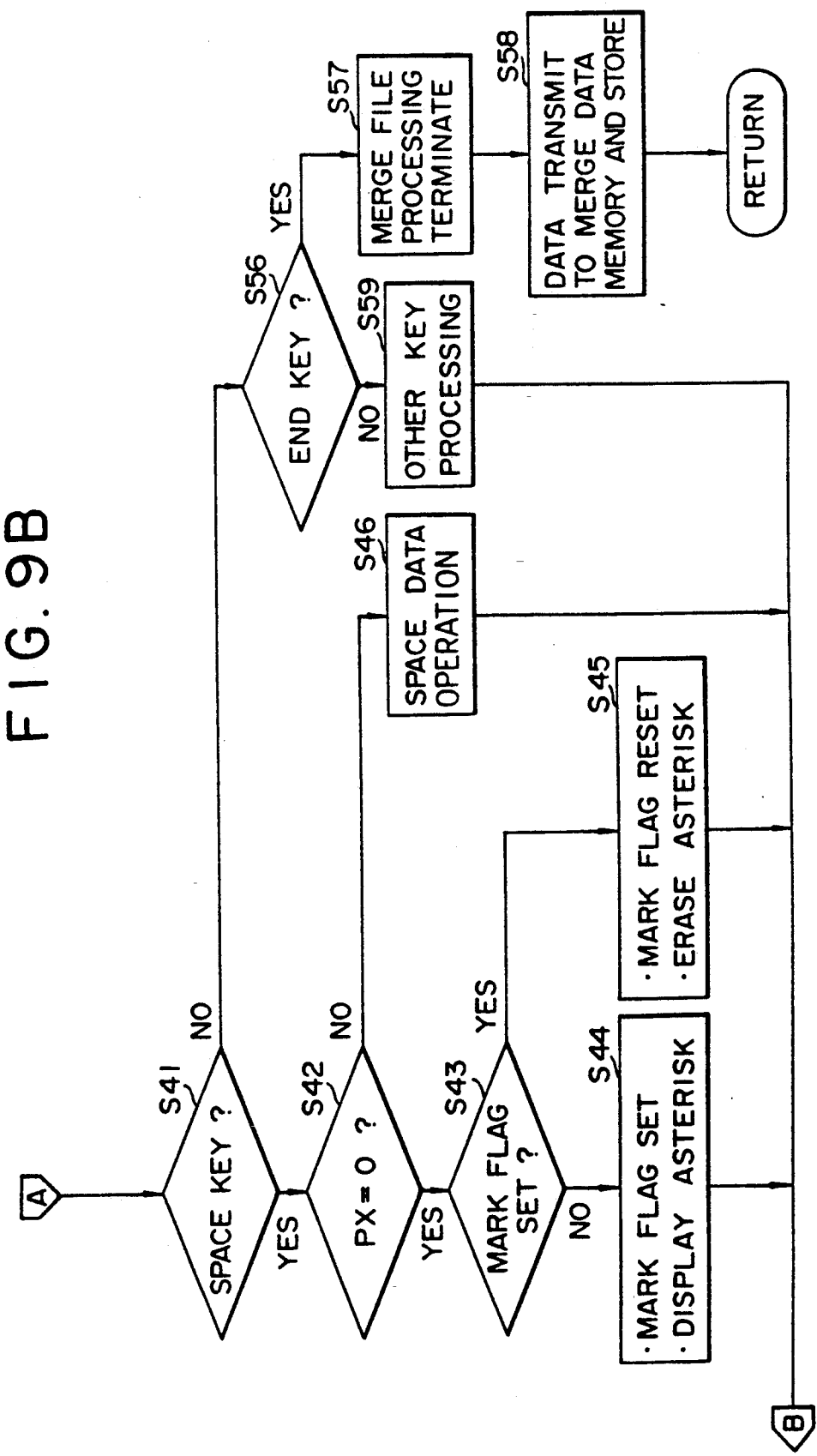

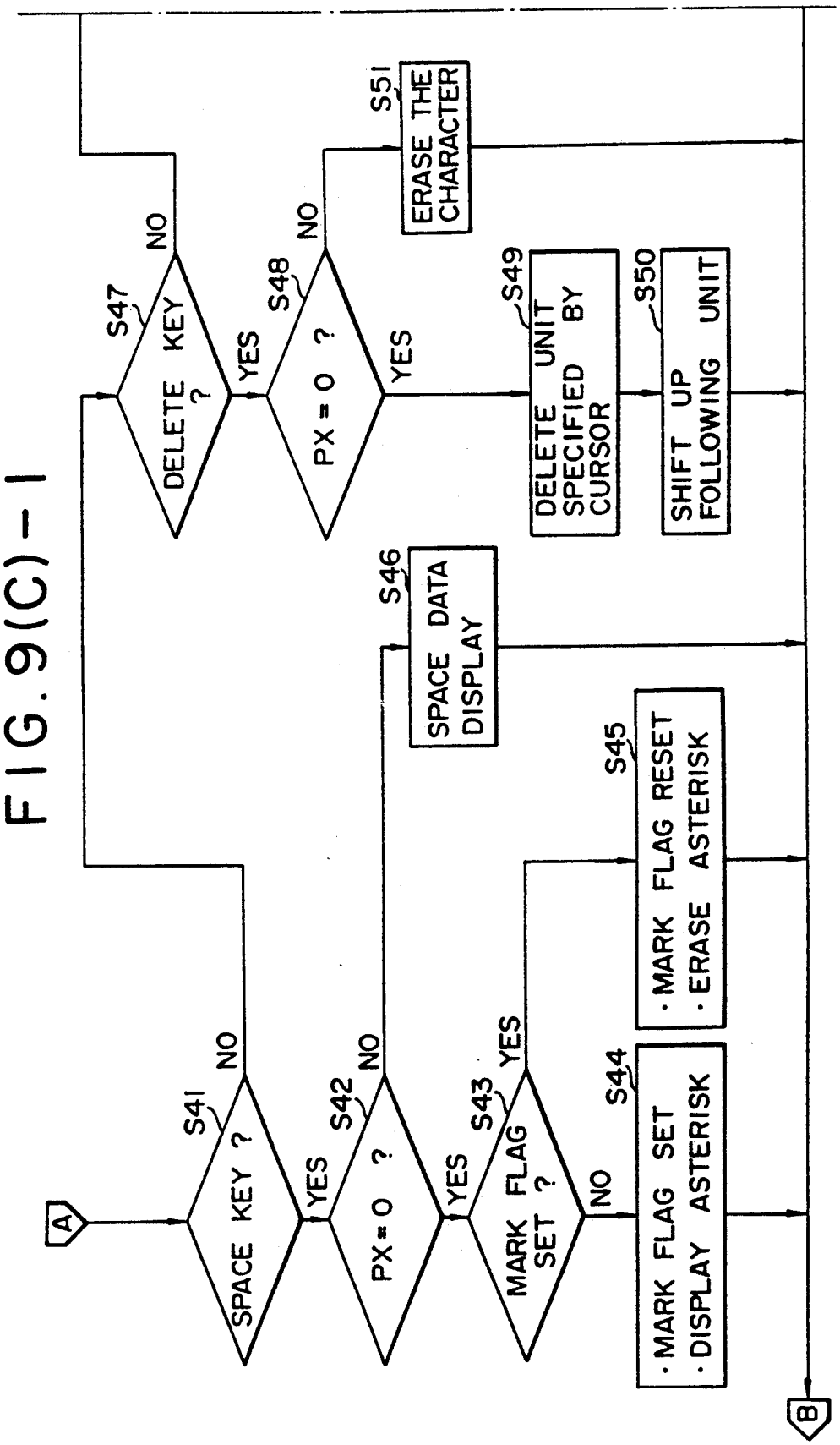

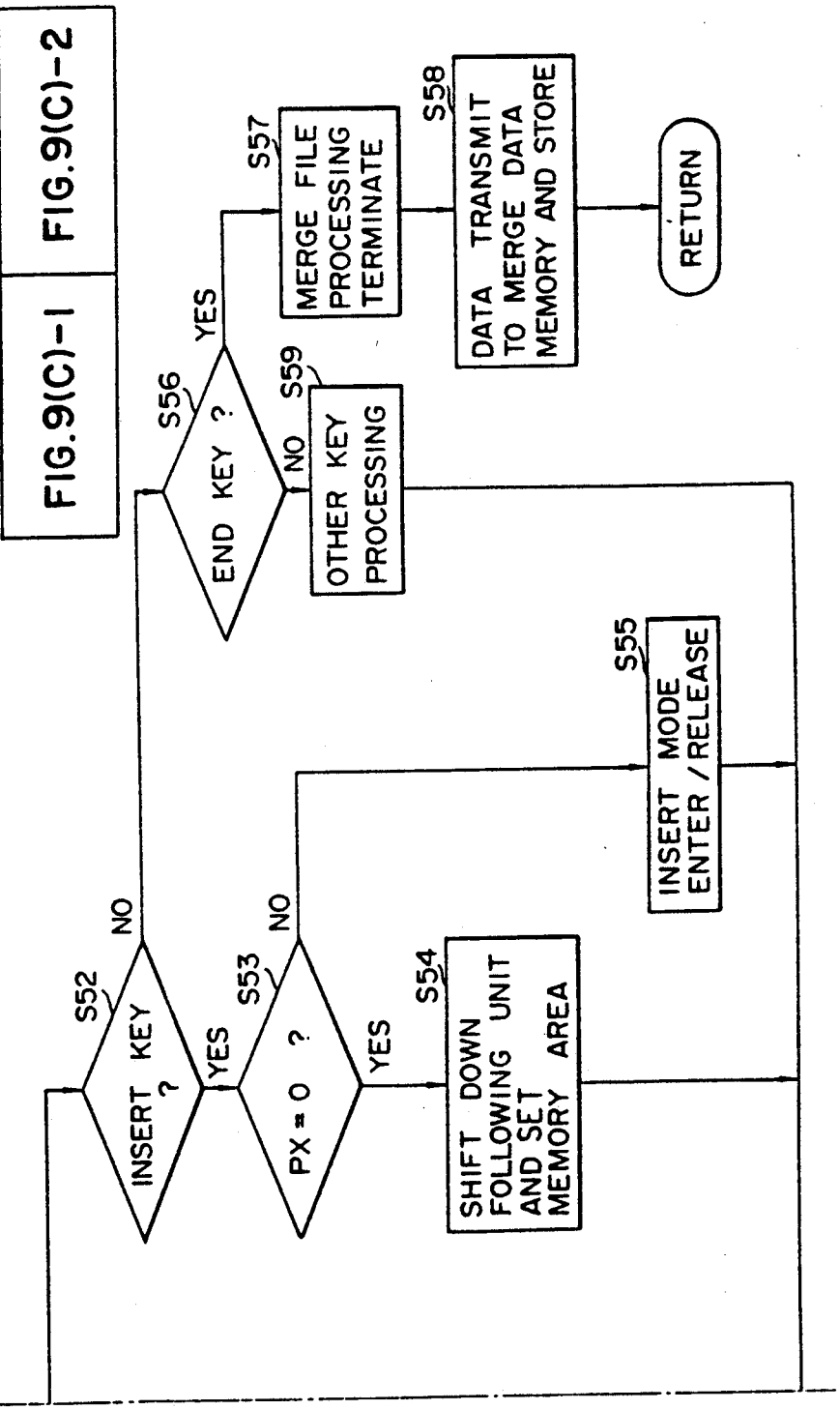

FIG. 12

| FILE: *MERGE | RECORD: 1 | LEBEL: 1 | | | |
|---|---|---|---|---|---|
| M1 | M2 | M3 | | | |
| ⒶMERICA | $100 | SEPTEMBER | | | |
| * CANADA | $200 | OCTOBER | | | |
| ⊡ JAPAN | $300 | NOVEMBER | | | |
| * ENGLAND | $400 | DECEMBER | | | |

FIG. 13

| FILE: *MERGE | RECORD: 1 | LEBEL: 1 | | | |
|---|---|---|---|---|---|
| M1 | M2 | M3 | | | |
| AMERICA | $100 | SEPTEMBER | | | |
| * CANADA | $200 | OCTOBER | | | |
| ⊡ ENGLAND | $400 | DECEMBER | | | |

FIG. 14

| FILE: *MERGE | RECORD: 1 | LEBEL: 1 | | | |
|---|---|---|---|---|---|
| M1 | M2 | M3 | | | |
| AMERICA | $100 | SEPTEMBER | | | |
| * CANADA | $200 | OCTOBER | | | |
| GERMANY | $500 | MARCH | | | |
| ⊡ JAPAN | $300 | NOVEMBER | | | |
| * ENGLAND | $400 | DECEMBER | | | |

FIG. 15

| 0 | 1 | 3 | M1 | AMERICA | M2 | $100 | M3 | SEPTEMBER |
|---|---|---|----|---------|----|----|----|-----------|
| 1 | 2 | 3 | M1 | CANADA | M2 | $200 | M3 | OCTOBER |
| 1 | 3 | 3 | M1 | JAPAN | M2 | $300 | M3 | NOVEMBER |
| 1 | 4 | 3 | M1 | ENGLAND | M2 | $400 | M3 | DECEMBER |

FIG. 16

| 0 | 1 | 3 | M1 | AMERICA | M2 | $100 | M3 | SEPTEMBER |
|---|---|---|----|---------|----|----|----|-----------|
| 1 | 2 | 3 | M1 | CANADA | M2 | $200 | M3 | OCTOBER |
| 1 | 3 | 3 | M1 | ENGLAND | M2 | $400 | M3 | DECEMBER |

FIG. 17

| 0 | 1 | 3 | M1 | AMERICA | M2 | $100 | M3 | SEPTEMBER |
|---|---|---|----|---------|----|----|----|-----------|
| 1 | 2 | 3 | M1 | CANADA | M2 | $200 | M3 | OCTOBER |
| 0 | 3 | 3 | M1 | GERMANY | M2 | $500 | M3 | MARCH |
| 1 | 4 | 3 | M1 | JAPAN | M2 | $300 | M3 | NOVEMBER |
| 1 | 5 | 3 | M1 | ENGLAND | M2 | $400 | M3 | DECEMBER |

DOCUMENT PROCESSING DEVICE WITH MERGE FUNCTION

BACKGROUND OF THE INVENTION

This invention relates to a document processing device for preparing the document with a merge symbols inserted into the document, and more particularly to such a device that is able to select a data record unit to be merge-printed with the data stored in a merge data memory being displayed on a CRT display or the like.

There has been known in the art a document processing device such as a word processor with a merge function, in which, when sending letters containing the same information to a number of people, the address, name and like personal information is merge-printed at the desired position of the document at the same time as printing the basic document in the form of such information letters, thereby producing multiple information letters in sequence.

In such a device, merge symbols are entered into the desired merge print position in the document data during preparation of the basic document. A data record unit contains more than one such merge data related to each other (for example, names and addresses) classified by the merge symbol. Such data record unit, given their record numbers, are classified to correspond to individual names of letter receivers and are registered in the merge data memory. When performing merge-printing, a merge print menu is displayed at first to allow the operating person to specify the file name of the basic document together with the range of record numbers of the record data to be merge-printed which are stored in the merge data memory. The data record unit with the selected record number is thus merge-printed with the specified basic document to provide a required number of information letters or the like .

Accordingly, it has been impossible to specify merge printing while viewing the group of data record units stored in the merge data memory. Also, it has been necessary to specify the range of record numbers each time merge print is to take place. If the contents of the data record unit stored in the merge data memory is not known to the operator, it has been necessary for the operator to display the merge data list included in the group of data record unit on the screen and to take notes of the record numbers of desired data record unit. So it has been impossible to start merge print processing until specifying the range of merge print is completed referring to the notes of the record numbers taken in advance. This has resulted in a considerable length of time consumed before starting printing, adversely, affecting the operability of the document processing device.

In order to solve these problems, there has been an improved document processing device with means for displaying the contents of the merge data memory in the form of a table, and of the case that there is any change in address or telephone number in letter receivers, the group of data record unit stored in the merge data memory is first displayed on the display screen. Desired addition or change can thus be effected in the multiple data record unit classified by merge symbols and represented in the form of a table for each data record unit. For example when one or more new letter receivers are to be added, the existing group of data record unit on the display is followed by an additional data record unit corresponding to the receiver added. When deleting the data record unit for a letter receiver because of canceling the contract or similar reason, the cursor is moved to the beginning of the corresponding record data to mark the zone for deletion. The data record unit is then deleted by pressing a return key or an execution key, or continuously pressing the erase key.

Accordingly, in order to delete a specific data record unit out of the group of data record unit stored in the merge data memory, it has been necessary to operate a character erase key so much times to delete the unnecessary record data in case of serial operation of the erase key, while in case of utilizing repeat function of the character key, it has been likely to delete part of the data record unit following the unnecessary data record unit.

Furthermore, a newly added data record unit is placed following existing data record unit so that it cannot be arranged in the alphabetical order based on the name of letter receivers, resulting in a serious difficulty in searching for the name of a letter receiver.

SUMMARY OF THE INVENTION

It is therefore an object of the invention to provide an improved document processing device with a merge function intended to correctly select the data record unit to be merge-printed out of the group of data record units stored in the merge data memory easily and with a simple operation.

Another object of the invention is to provide an improved document processing device having a merge data change control function for deleting and adding a memory space for a data record unit with a simple operation.

For this purpose, according to one aspect of the invention, there is provided a document processing device comprising inputting means for inputting character codes and function codes, display means for displaying character data corresponding to the character codes, designating means for designating a point at which a character data is inputted on said display means, first memory means for storing document files prepared by the data corresponding to the inputted codes, merge symbol inserting means for inserting a predetermined character data in said document file as a merge symbol, merge symbol number setting means for setting and storing the number of merge symbol being inserted in said document file, said document processing device further comprising;

second memory means for storing a plurality of data record units, each data record unit including memory area and each of said memory area corresponding to each numbe of merge symbols;

display control means for displaying the contents of said second memory means on said display means with said each number corresponding to each memory area;

assigning means for assigning a predetermined code to each desired data record unit;

erasing means for erasing said predetermined code assigned by said assigning means; and print control means for printing the contents of said document file in such a fashion that each merge symbol inserted in said document file is respectively substituted for the data stored in said memory area of each data record unit to which said predetermined code is assigned by said assigning means.

According to another aspect of the invention, there is provided a document processing device comprising inputting means for inputting character codes and function codes, display means for displaying character data corresponding to the character codes, designating means for designating a point at which a character data is inputted on said display means, first memory means for storing document file prepared by the data corresponding to the inputted codes, merge symbol inserting means for inserting a predetermined character data in said document file as a merge symbol, merge symbol number setting means for setting and storing the number of merge symbol being inseted in said document file, said document processing device further comprising;

second memory means for storing a plurality of data record units, each of said data record unit including memory areas and each of said memory area corresponding to each number of merge symbol;

display contol means for displaying the contents of said second memory means on said display means with said each number corresponding to each memory area;

selecting means for selecting one of said data record units on condition that the contents of said second memdory means are displayed on said display means;

memory control means for deleting the data stored in the data record unit selected by said selecting means in case that first predetefmined code is further inputted, while inserting an additional data record unit between the data record unit selected by said selecting means and the data record unit arranged just above said selected one in case that second predetermined code is further inputted; and print control means for printing the contents of said document file in such fashion that each merge symbol inserted in said document file is respectively substituted for the data stored in said memory area of each data record unit.

DESCRIPTION OF THE ACCOMPANYING DRAWINGS

FIG. 4 is a data configuration diagram of a data record unit stored in a merge data memory.

Figure 10:
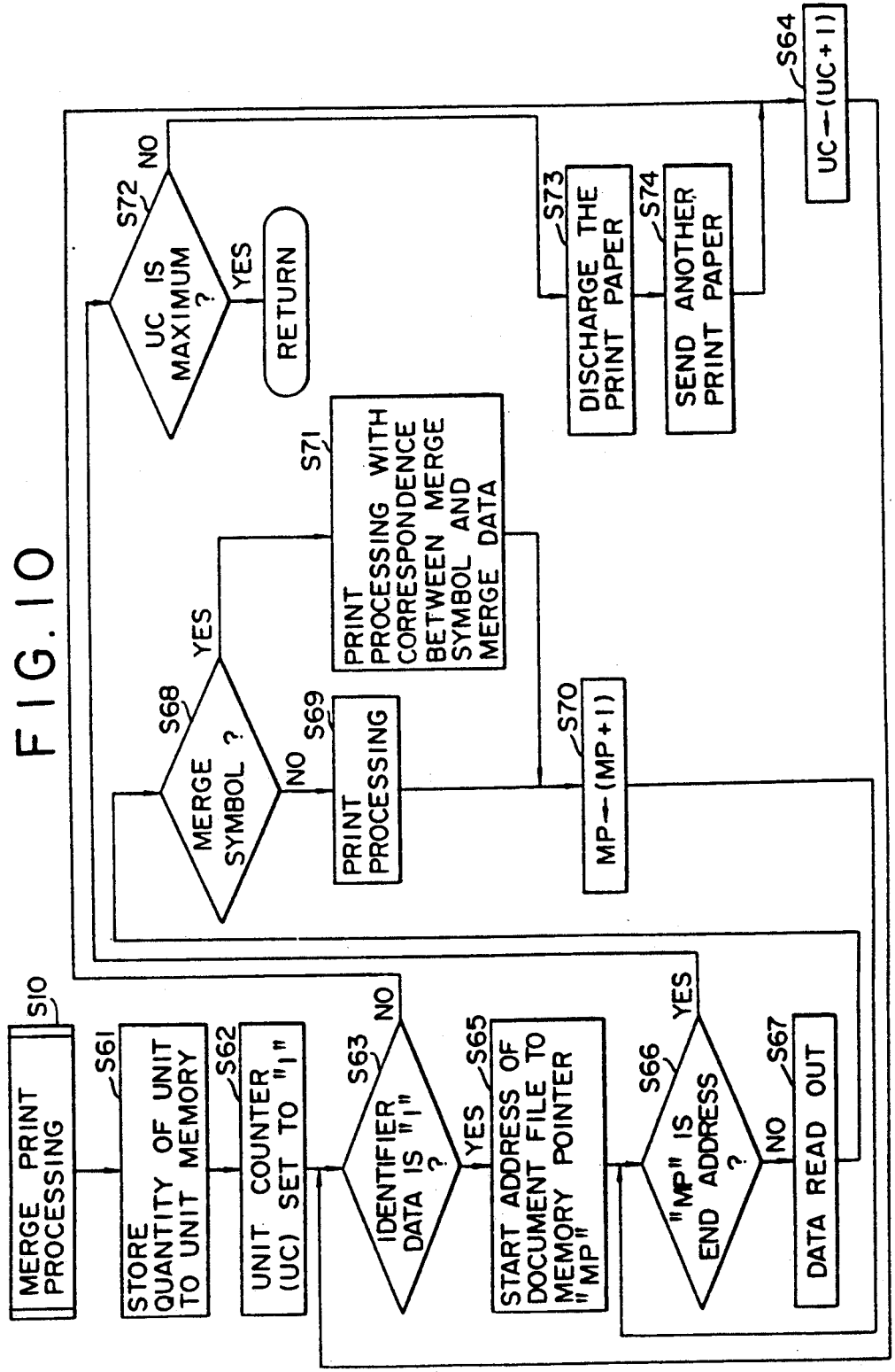
Figure 11:
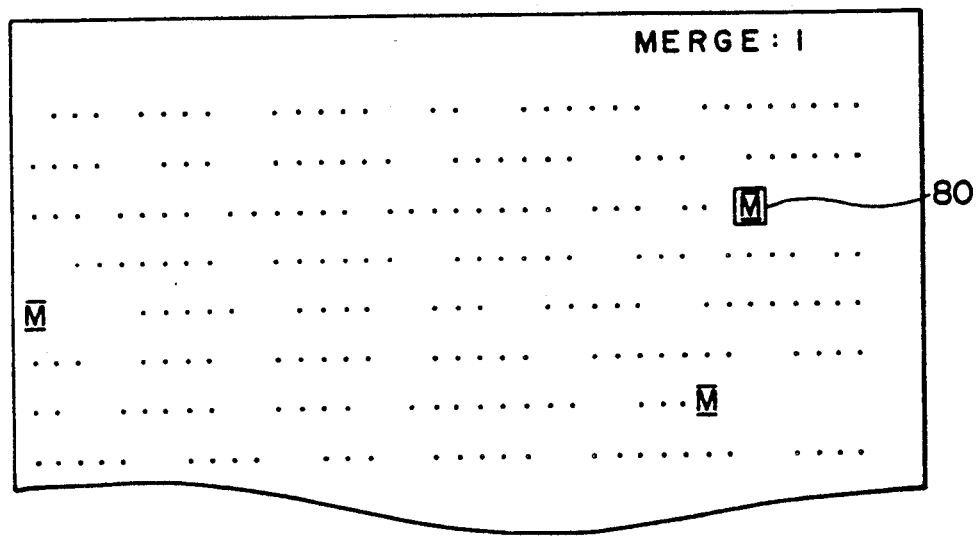
Figure 18A:
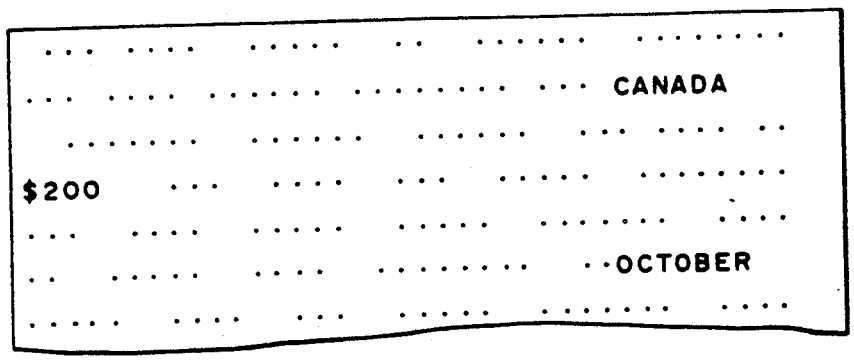
Figure 18B:
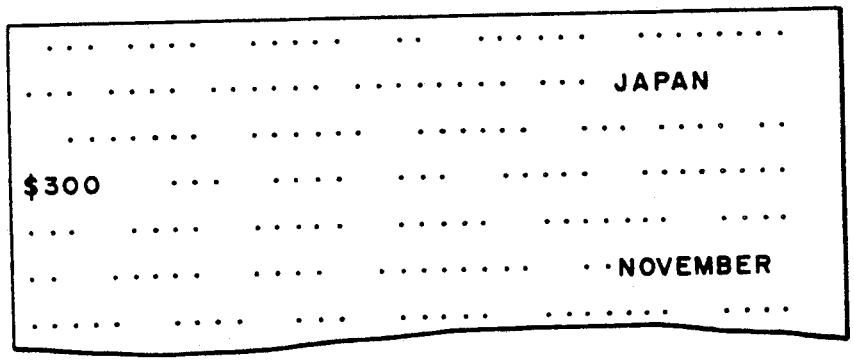
Figure 18C:
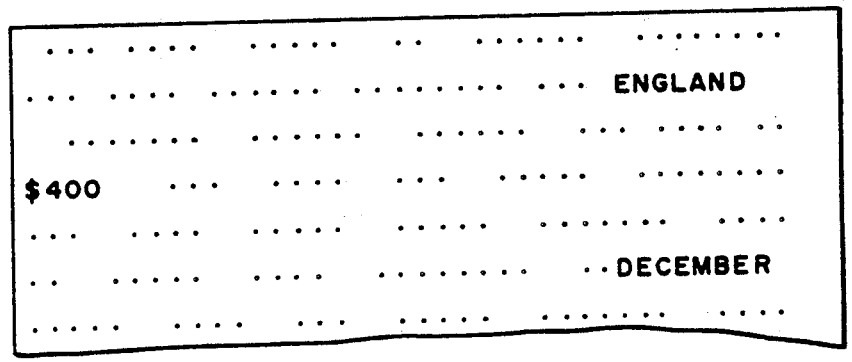

FIGS. 6(a)-(c) and 7(a)-(c) are explanatory views of data setting arrangement,

FIG. 8 is a flow chart showing the routine of the data setting arrangement,

FIG. 9(A) through 9(C) are flow charts of programs executed in a merge print select control processing and a merge change control processing, FIG. 10 is a flow chart of program executed in a merge print control processing, FIG. 11 is an explanatory view showing a document including merge symbols, FIG. 12 through 14 are explanatory views showing merge data displayed on the CRT display, FIG. 15 through 17 are illustrative views of the merge data shown in FIG. 12 through 14 stored in the merge data memory, FIG. 18(A) through 18(C) are views showing print examples with merge data.

DESCRIPTION OF THE EMBODIMENTS

Figure 1:
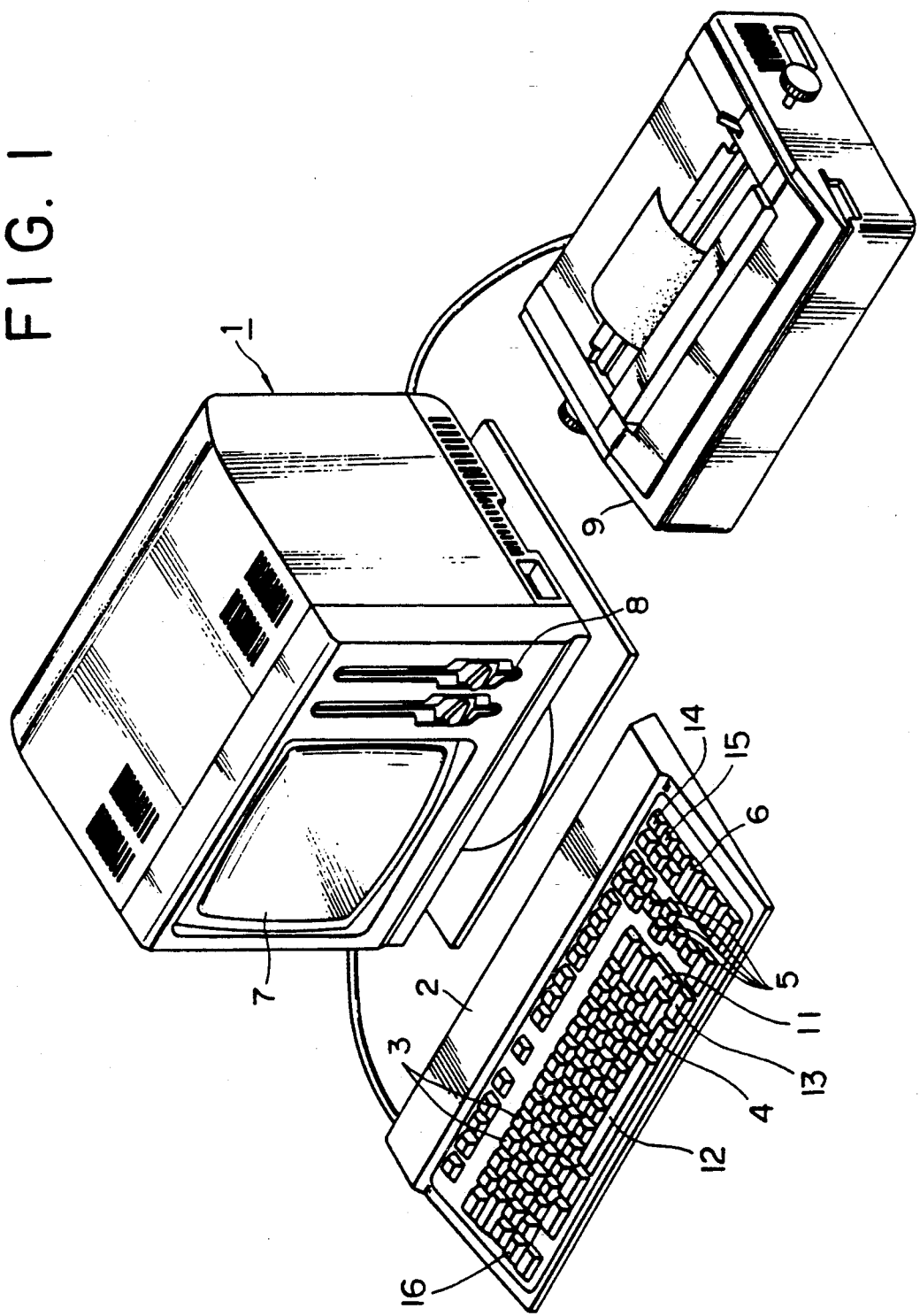
FIG. 1 is a perspective view of the document processing device embodying the invention.

FIG. 1 shows a document processing device embodying the invention, wherein the document processing device 1 comprises a keyboard 2 on which a number of character keys 3 and a print key 4 are provided. Different character and numerical data can be selected by operating the corresponding character keys 3. To the right side of the character keys provided are cursor move keys 5 for moving a cursor in four different directions and a merge key 6 for specifying a merge position for insertion of merge data in a document consisting of character data.

Furthermore, a return key 11, a space key 12 for moving a carriage (described below) rightward one by one, a delete key 13 for deleting the displayed character, and an insert key 14 for inserting a character into the displayed character string, are provided as in an usual typewriter, and a tab clear key 15 for varying a memory area of the memory stored in the document processing device 1, and end key 16 for terminating a processing executed by the control system described below are further provided on the keyboard 2

The document processing device 1 further comprises a CRT 7 for displaying the document being edited, a floppy disk drive 8 placed by the CRT 7 to record document data on a medium, and a printer 9 for printing characters and the like on print paper.

The print mechanism PM of the printer 9 includes at least a platen for feeding print paper, a motor for driving it with a drive circuitry for the motor, a carriage provided in parallel with the platen, a motor for driving it horizontally and its drive circuitry, a print wheel housed in a wheel cassette, a motor to drive it and its drive circuitry, a print ribbon housed in a ribbon cassette, a motor to wind it up and its drive circuitry, a print hammer for hammering types on the print wheel, a solenoid for actuating it and its drive circuitry, the arrangement of the print mechanism being the same as those in ordinary electronic typewriters.

Figure 2:
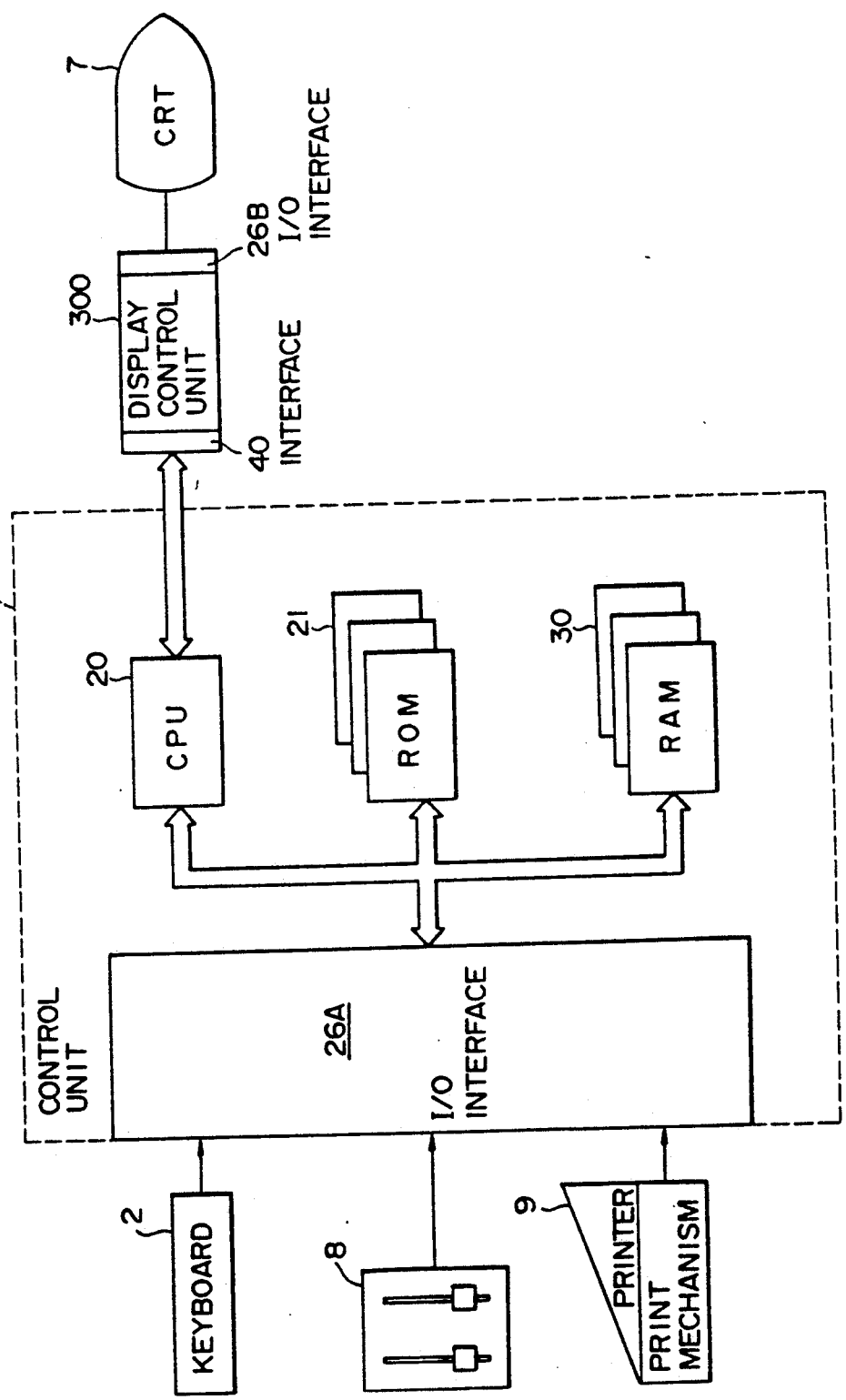
FIG. 2 is an electrical configuration diagram of the document processing device embodying the invention.

Brief explanation is now given for the electrical arrangement of the document processing device 1 mentioned above in accordance with FIG. 2. The document processing device 1 is primarily constituted by an electronic control unit 200 to execute logical operations, the operation procedures being controlled by control programs stored in ROM (Read Only Memory) 21 in advance. When an instruction is entered through keyboard 2 into the electronic control unit 200 to selectively executed one of those control programs, the CPU (Central Processing Unit) 20 decodes the instruction and starts execution in accordance with the specified control program. An I/O (Input/Output) interface 26A is provided to control data communication between the electronic control unit 200 and external units such as keyboard 2, floppy disk drive 8 and printer 9. It incorporates, as is known, a buffer and when required a multiplexer and A/D converter.

Figure 3:
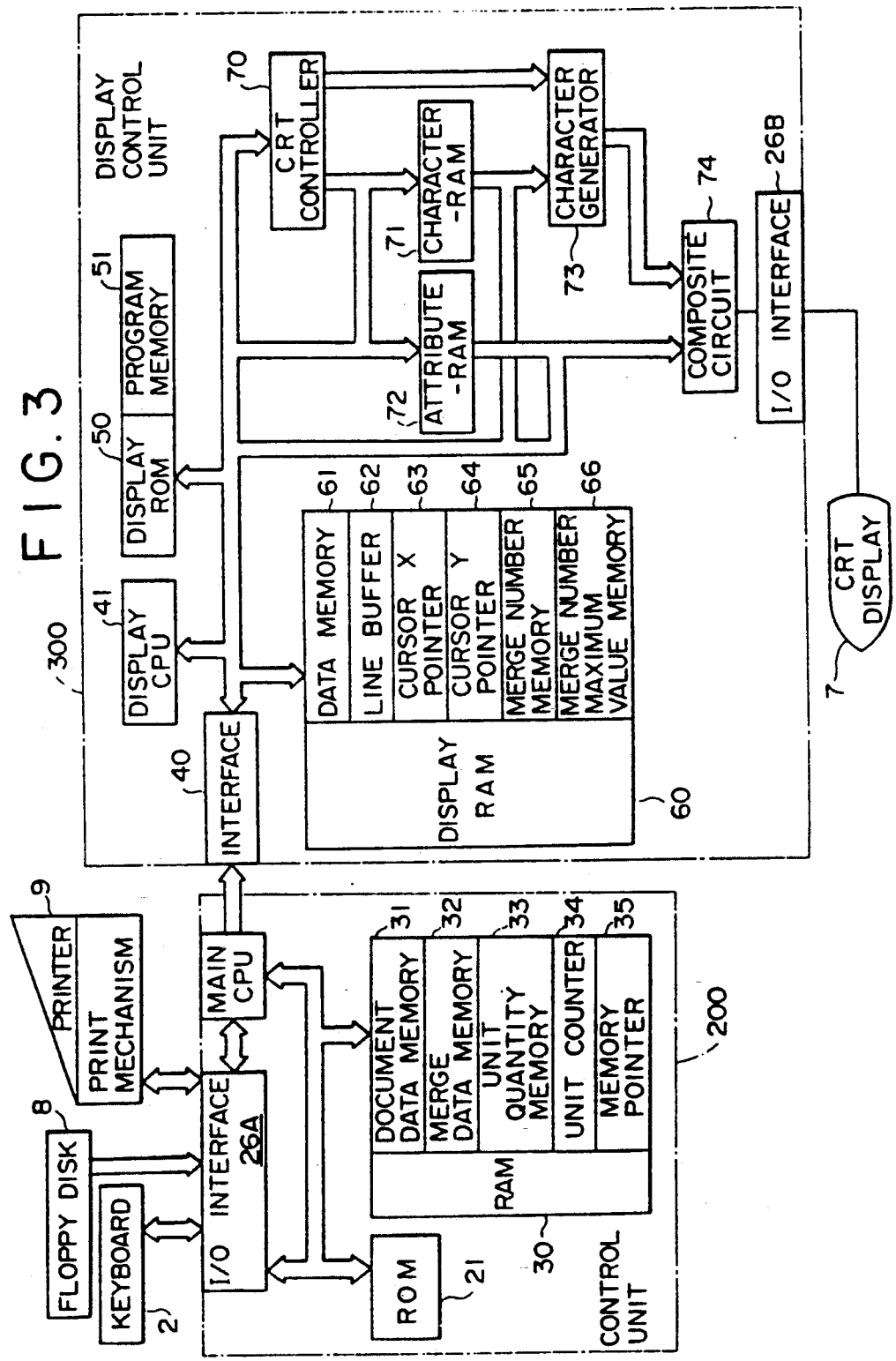
FIG. 3 is a detailing configuration diagram of FIG. 2.
Figure 5:
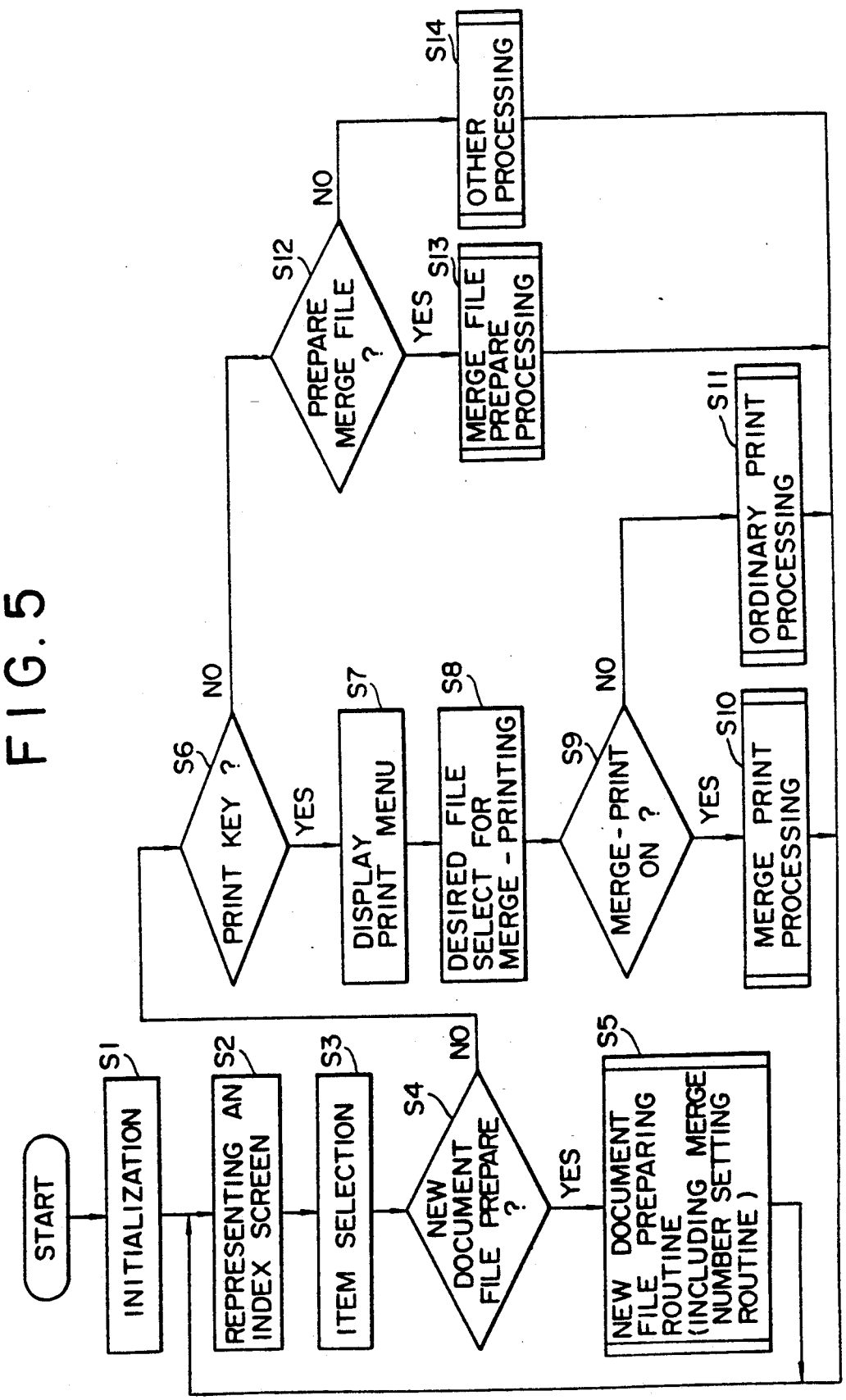
FIG. 5 is a flow chart showing the routine of the merge print select control processing.
Figure 6A:
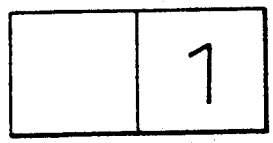

Furthermore, the detailed configuration of the control system for the document processing device 1 is described with reference to a block diagram shown in FIG. 3.

The control unit 200 is provided, besides the main CPU 20, with ROM 21 and RAM (Random Access Memory) 30 which are connected to the main CPU 20.

ROM 21 contains therein a print control program for controlling the print mechanism PM, a control program for controlling memories in RAM 30, a program for examining whether the code data entered through the keyboard 3 is a character data or a command data and decoding the command data, and a merge print control program for merge-printing a document data.

RAM 30 contains therein a document data memory 31 for storing a document data being prepared, a merge data memory 32 containing multiple sets of data record units each consisting of interrelated merge data classified by merge symbols, a unit quantity memory 33 containing a number of data record unit stored in the merge data memory 32 when merge-printing operation is executed, a unit counter 34 for sequentially indicating the data record unit to be merge-printed, a memory pointer 35 indicating the position of reading the document data, and other memories for tentatively storing the result of operation by the main CPU 20. Each data record unit, as shown in FIG. 4, consists of an identifier memory area for storing identifier data to specify merge-printing, a unit No. memory area, a number memory area for storing a number of merge data, a merge symbol (M1), a merge data corresponding to the first merge symbol, another merge symbol (M2), a merge data corresponding to the second merge data, still another merge symbol (M3), a merge data corresponding to the third merge symbol . . . i.e. a plurality of combination of merge symbol and merge data arranged in a row.

Each of the data record units, usually, includes twenty memory areas for storing merge data and each memory area has memory capacity for storing seven characters data. Accordingly, each data record unit includes memory capacity for storing one hundred and forty characters data, and the memory capacity value is constant for all data record units.

The main CPU 20 transmits the code data entered through the keyboard 3 to a display control unit 300 via interface 40, in accordance with the programs stored in ROM 21. The main CPU 20 also writes the data processed by the display control unit 300 into memories 31 and 33 in RAM 30 or transmits a specified data in RAM 30 to the display control unit 300.

Explanation is now given on the display control unit 300.

Connected to the main CPU 20 via interface 40 is a display CPU 41 which is in turn connected to a display ROM 50, a display RAM 60, a CRT controller 70, a character RAM 71, an attribute RAM 72, a character generator 73, and a composite circuit 74 by way of data bus.

Program memory 51, including a document file preparing control program and a merge file preparing control program, provided in a display ROM 50 further includes therein a cursor move control program for controlling a position on which data is to be written in a line buffer 62 in accordance with the entry through the cursor move keys 5 provided on the keyboard 2, a CRT control program for controlling a CRT controller 70, and a processing control program for controlling processing of the data transmitted from the main CPU 20 and editing the contents of a data memory 61.

Display RAM 60 includes a data memory 61 for storing the file data read from the file data being prepared in RAM 30, a line buffer 62 for storing a data of one edit line including cursor out of the one-screen data stored in data memory 61 that is displayed on the CRT display 7, a cursor X pointer 63 sequentially updating the cursor-indicated position in accordance with horizontal movement of the cursor, a cursor Y pointer 64 sequentially updating the cursor-indicated position in accordance with vertical movement of the cursor, a merge number memory 65 storing a number of a merge symbol corresponding to the merge data specified by the cursor when editing merge data, a merge number maximum value memory 66 storing the maximum value of merge numbers, and other memories tentatively storing the result of operation by the display CPU 41. The data memory 61 contains a mark flag for each data record unit so as to indicate an indentifier mark (asterisk*) as soon as preparing a merge file has begun.

Character RAM 71 stores therein a code data of characters and/or symbols across one screen displayed on the CRT display 7 in a position corresponding to display position on the CRT display 7. Stored in an attribute RAM 72 are different modifier data for the code data stored in character RAM 71.

Character generator 73 contains about 400 kinds of display data corresponding to the code data to give characters and symbols to the display 7. Each display data is constituted by a dot pattern consisting of 16 bytes. Composite circuit 74 combines the character and symbol display data received from the character generator 73 and the modifier data received from the attribute RAM 72.

Display CPU 41 develops an image of the data read from the data memory 61 on the screen in accordance with command data, while at the same time writing the code data received from main CPU 20 via interface 40 into the line buffer 62 at the position specified by the cursor. It also controls cursor movement by informing the CRT controller 70 of the address to which the cursor is to be moved.

CRT controller 70 controls a screen on the CRT display 7 in synchronism with raster signals so that the data transmitted from the character generator 73 in accordance with the code data written into the character RAM 71 and the modifier data sent from the attribute RAM 72 are combined together by means of the composite circuit 74 to be transmitted to the CRT display 7 for display thereon.

Now described with reference to FIG. 5 through FIG. 10 are a merge data change control routine executed by the display control unit 300 and the merge print control routine by the control unit 200.

This processing includes steps of placing merge symbols at merge positions in the document and preparing plural merge data corresponding to the merge symbols, which replace one with another to prepare from one document more than one document each partly containing different information.

When the power of the document processing device is turned on, a processing starts with a control for selection of processing items: Processing goes to step S1 (referred to simply as S1 below, as is done for all other steps) where initialization takes place. The CRT display 7 then displays an index screen such as "PREPARE NEW FILE", "PREPARE MERGE FILE", "FILE NAME PREPARED" (S2), so that selection of one item on the CRT display 7 takes place (S3). When the cursor on the screen is moved to the beginning of the item "PREPARE NEW FILE" or "FILE NAME PREPARED" and a return key 11 provided on the keyboard 2 is pressed (S4), a document file preparing processing is executed in accordance with the document file preparing control program and after editing processing is completed, the document data is transmitted to and stored in the document data memory 31 in RAM 30 (S5). When data insertion into the document data is intended, a screen for specifying the merge print position by operating a merge key 6 provided on the keyboard 2, while at the same time for setting the number corresponding to the number of merge data is displayed as shown in FIG. 11. The number of the merge data is then set by entering a desired number through a numeric key 3 provided on the keyboard 2 and pressing the return key 11. In the document data shown in FIG. 11, merge printing at the third line (M1), the fifth line (M2) and the seventh line (M3) is specified by operation of the merge key 6. The number of the merge data is, as shown in FIG. 11, indicated in the space following "MERGE:" at top corner of the CRT display 7 only when the cursor 80 is moved to the display symbol "M". The number of merge data can be set as desired by users.

Now described with reference to FIG. 6 through FIG. 8 are a merge number setting routine employed in this embodiment for simply setting the number of merge symbol being inserted in the document file.

This processing is started when the merge key is operated. At this time, the display screen 7 displays a symbol "M" at a position for insertion of the document as described before and shown in FIG. 11, with character "MERGE" and blinking space for a two-digit figure indicated at the top right corner of the screen. For example, in case that the number to be set is "12", conventionally, the display first gives the first digit "1" in the lower-order digit place (FIG. 6(a)). The first-digit "1" is then shifted to the higher-order digit place and the second digit number "2" appears on the lower-order digit place to show the whole two-digit figure "12" (FIG. 6(b)).

Figure 6B:
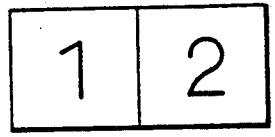
Figure 6C:
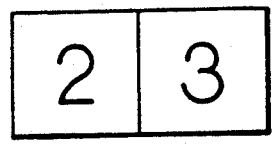

In such a prior art system, however, when the operator intends to correct the figure "12" already entered to a one-digit figure "3" by entering numeral "3" follwing the figure "12", numeral "2" is shifted to the higher-order digit place to show the figure "23" on the display (FIG. 6(c)). Otherwise, numeral "3" keyed in is not accepted with no change in the figure "12" on the display. In order to correct figure "12" once set to numeral "3" in the prior art, therefore, it has been necessary to reset the figure "12" already set and re-enter numeral "3".

Figure 7A:
Figure 7B:
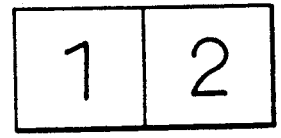

With the start of the processing, initialization takes place to set a key-in flag F, described below, to 0 (S100). Whether or not there has been any key entry is then determined (S110), awaiting a key input, if none. When there is a key input, whether or not it is an input with the numeric key 3 is determined (S120). When it is a numeric key entry, whether or not the key-in flag F is 1 is determined (S130). The key-in flag F is to be set to 1 because it is kept at 0 by initialization (S140). Numeric data set by execution of the preceding processing which is still present in the merge number maximum value memory is eliminated (S150) and a numeric data entered through the numeric key is stored in the lower-order digit place in the merge number maximum value memory 66 (S160). The numeric data thus contained in the merge number maximum value memory is then displayed on the display 7 (S170). When numeric data entered by the numeric key 3 is "1", "1" appears on the top right corner of the display screen of FIG. 11, as shown in FIG. 7(a).

With such display on the screen 7, processing in S110 is repeated and if the numeric data to be set is only a one-digit number, the operator presses the return key 11 for terminating the setting operation (S110). The return key 11 is thus identified (S120, 180) to release the merge number setting mode, returning to the ordinary document processing mode (S190). If the key entry is through neither numeric key 3 (S120) nor return key 11 (S180), for instance, if it is through a character key 3, an audible buzzer signal is given to inform the operator of erroneous entry.

When the operator intends to set a two-digit figure, on the other hand, a numeric key 3 for the second-digit numeric data is pressed following the numeric key 3 for the first-digit numeric data. S110 and the succeeding steps are thus repeated so that the key-in flag F is identified as 1 when the second digit numeric key 3 is pressed (S130). Executing processing in step 160 within the merge number maximum value memory 66 then shifts the numeric data stored in the lower-order digit place to the higher-order digit place (S210).

The second-digit numeric data entered is then stored in the lower-order digit place of the merge number maximum value memory 66 (S220). It is subsequently determined whether or not the two-digit numeric data stored in the merge number maximum value memory 66 exceeds a preset maximum value a, for instance "20" (S230). If the numeric data is smaller than the maximum value a, the data within the merge number maximum value memory 66 is shown on the display 3 (S170). This, when the second digit numeric data entered is "2", figure "12" is shown at the top right corner of the display screen of FIG. 11. When this is followed by operator's pressing the return key 11, "12" will be set as numeric data (S180, 190).

When correction or change of the data entered is intended, for instance, from "12" to "3", the operator presses "3" numeric key 3 instead of pressing the return key 11, so that processing in S110 through 130, 210 and 220 is executed to shift the data in the lower-order digit place to the higher-order digit place in the merge number maximum value memory 66. Numeric data "3" is then stored in the lower-order digit place in the merge number maximum value memory 66. Accordingly "23" has been stored in the merge number maximum value memory 66 as numeric data.

Figure 7C:
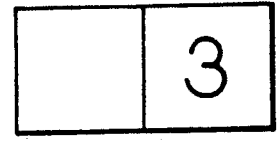

In this condition, processing in S230 determined that the numeric data within merge number maximum value memory 66 exceeds the maximum value a, the entered data will not be displayed on the display 7, with the numeric data in the higher-order digit place only eliminated from the merge number maximum value memory 66 (S240). Thus, only "3" in the lower-order numerical data still remains in the merge number maximum value memory 66. Subsequently, a buzzer sound is given to cause the operator to check the figure with the numeric data in the merge number maximum value memory 65 shown on the display 7 (S170). In particular, if the numeric data entered through the numeric key is "3", a one-digit number "3" appears at top right corner of display screen of FIG. 11 as shown in FIG. 7(c).

When the operator then presses the return key 11, "3" is set as numeric data (S180, 190).

Thus, if the numeric data first entered through the numeric key 3 is "1" and "2" and a correction data entered later is "3", the later entered number "3" is set as numeric data. If the first-entered numeric data is "1" and "2", and the later-entered correction data is a two-digit figure "1" and "5", "15" is set as numeric data by the processing in S210 and 220.

While this embodiment gives an example with the numeric data of two-digit figure to be set, a three or more digit figure can be set in the like manner. For instance, if the first-entered numeric data is "1", "5" and "6" with a maximum value of "500", and the correcting or replacing numeric data is "61". "1" is subsequently entered to shift the numerical data within the memory 66 to a higher order digit place one by one so that "561" is stored as numeric data. However, since this figure exceeds the maximum value "500", the numeric data in the highest order digit place is eliminated to allow "61" to be stored in the memory 66. "61" is set as numeric data by pressing down the return key 11.

There may be an alternative arrangement in which, when the maximum value a is exceeded, the last-entered number, i.e., the number in the lowest order digit place is made effective, while eliminating all the higher-order digits.

After the merge number is set by the procedure described above and the document file is completed in S5, the following processing is executed.

When the print key 4 is operated (S6), the print mode is entered so that the list of the name of files already are displayed as print menu (S7). The cursor is then moved to the position of the desired file name, with the return key 11 then depressed (S8). In S8, "MERGE PRINT: ON" or "MERGE PRINT: OFF" is shown right to the indication of the document file name. When the cursor 80 is now moved to "ON", with a space key 12 provided on the keyboard 2 being operated, it is switched to "OFF" so as to specify no merge printing, while by moving the block cursor to "OFF" and pressing the space key 12, it is changed to "ON" to effect merge printing. Here, the index memory (not shown) of the display RAM 60 containing the name of files prepared is provided with a merge print flag for each document file name. As a result, a merge print flag corresponding to the document file whose name is indicated next to "ON" is set, while resetting the merge print flag corresponding to the document file with "OFF" on display.

When the return key 11 is operated in S8, it is examined whether or not merge printing is to be executed in accordance with the merge print flag for the document file specified by the cursor 80 (S9). If answer is Yes, merge print processing is executed (S10), while with No, ordinary printing procedure takes place (S11).

When the cursor 80 is moved to the beginning of item "PREPARE MERGE FILE" with the return key 11 then being pressed (S12), a merge file preparing processing is executed in accordance with the merge file preparing control program (S13). When other items have been selected, other processing takes place (S14).

The merge file preparing processing executed in S13 in accordance with the merge file preparing control program is now described with reference to FIGS. 9(A) through 9(C).

Data is read from the merge data memory 32 of RAM 30 so that a merge file is indicated on the CRT display 7 as shown in FIG. 12 (S20). The merge file displayed on the CRT display 7 consists of a merge symbol display area 81, a merge data display area 82 for displaying a plurality of data record units, and an identifier mark display area 83 located left of the merge data display area 82 (for example, asterisk "*" is used as an identifier mark). Each of the memory area included in one of the data record units is usually capable of storing seven characters as described before. The memory area capacity for storing characters is variable by operating a tab clear key 15 provided on the keyboard 2.

As shown in FIG. 12, the merge data having more then seven characters, for example "SEPTEMBER", are stored in one memory area. However, the total memory capacity for each data record unit, i.e. for storing one hundred and forty characters, is constant as described before too.

The cursor 80 is now at its home position, i.e., at the left end of the first data record unit in the merge data display area 82 (S21), and the cursor X pointer 63 and cursor Y pointer 64 are set to the initial value "1" (S22). The cursor X pointer 63 is set to "0" when the cursor 80 is moved to the identifier mark display area 83.

When a character key 3 is then operated (S24), the entered character code is stored in the data memory 61 by way of character RAM 71, while at the same time the character is displayed on the CRT display 7 as specified by the cursor 80 (S25). The cursor 80 is then moved to right by one digit (S26), returning to S23. When a cursor right move key 5 provided on the keyboard 2 is operated (S27), the cursor 80 is moved to right by one digit (S28) so that the value PX of cursor X pointer 63 is incremented (S29). When the cursor 80 is moved between two memory areas which are adjacently arranged in the same data record unit, in accordance with the data in cursor X point 63 and the character number data (S30), it is examined based on the data N in merge number memory 65 and the data L in merge number maximum value memory 66 whether or not the merge No. N corresponding to the memory area where the cursor is located is larger than the maximum value L of merge number (S31). If the merge number N is larger than the maximum value L, a new merge number given by updating the merge number by one digit is displayed on the merge symbol display area 81 (S32). The merge number N of the memory area where the cursor 80 is currently located is then stored in the merge number maximum value memory 66 (S33), returning to S23. That is, merge symbols are shifted in sequence to M1, M2 and M3 with rightward movement of the cursor 80.

When a cursor left move key 5 provided on the keyboard 2 is operated (S34), the cursor 80 is moved to left by one digit (S35) so that the value of cursor X pointer 63 is decremented (S36). When the current position of cursor 80 is one digit smaller than the value L in the merge number maximum value memory 66 and when there is no data corresponding to the memory area specified by the value L of the merge number maximum value memory 66 (S38), the merge number of the memory area specified by the merge number maximum value memory 66 is erased from the merge symbol display area 81 (S39) so that the value L in the merge number maximum value memory 66 is decremented, returning to S23. That is, if there is no merge data in the displayed memory area, the merge number corresponding to this memory area is erased.

Steps C23 through S40 are repeated so that, as shown in FIG. 12, multiple data record unit are classified by merge symbols M1 to M3 and indicated in the form of table made of each data record unit.

Further, with the space key 12 pressed (S41) as shown in FIG. 9(B), the merge print select control processing, for selecting data record unit to be merge-printed is executed. While, with a delete key 13 or insert key 14 both provided on the keyboard 2 pressed (S47 or S52), a merge data change control processing, for setting memory space for one data record unit in the merge data memory and for deleting data stored in the data record unit from the merge data memory, is executed as shown in FIG. 9(C).

When, with the space key 12 pressed (S41), as shown in FIG. 12, the cursor 80 is located in the identifier mark display area 83 depending on the data PX in cursor X pointer 63, that is, when PX is O, it is examined in accordance with the data in cursor Y pointer 64 and mark flag data stored in the data memory 61 whether or not the mark flag is set (S43). When there is no mark flag set, the mark flag is set and the asterisk mark * (identifier mark) is shown on the identifier mark display area 83 (S44). When there is a mark lag set, the mark flag is reset and at the same time, the assterisk mark * shown in the identifier mark display area 83 is erased (S45). That is, the data record unit to be merge printed is marked with the asterisk *, while no asterisk is given to the unit not to be merge printed, so that merge print can be selected separately for each data record unit. In the example shown in FIG. 12, the 1st unit is not be merge printed, while the 2nd to 4th unit are chosen to be merge printed. When the cursor position 80 on display is outside the identifier mark display area 83 with the space key 12 pressed (S42), a space is indicated at the position specified by the cursor 80 (S46).

With the delete key pressed (S47), when PX is O depending on the data PX in the cursor X pointer 63 (S48), the data record unit specified by the cursor 80 on the CRT display 7 depending on the data in cursor Y pointer 64 is deleted (S49). The data record unit following the unit deleted is then shifted up one by one on the display (S50). When the cursor position 80 on display is within the merge data display area 82 (S48), the character specified by the cursor 80 is deleted (S51). When for instance, the delete key 13 is operated with the cursor 80 located in a position indicated by the phantom line in FIG. 12, the data record unit in the 3rd unit is erased from the CRT display 75 as shown in FIG. 13 so that the data in the 4th unit is shifted up to be indicated as the 3rd data record unit. Consequently, the specified unit can be deleted as a whole merely by operating the delete key 13, ensuring an improved efficiency in editing operation.

With the insert key 14 pressed (S52), when PX is O depending on the data PX in the cursor X pointer 63 (S53), all of the unit following that specified by the cursor 80 on the CRT display 7 depending on the data in cursor Y pointer 64 are shifted down one by one on the display and a new memory space for one data record unit is set (S54). When the cursor position 80 on display is within the merge data display area 82 (S53), insert mode is entered or released every time the insert key 14 is operated (S55). When, for instance, the insert key 14 is operated with the cursor 80 located in a position indicated by the phantom line in FIG. 12, all of the data record unit following that in the 3rd unit are shifted down one by one on the CRT display 7 as shown in FIG. 14 and a memory area for one record data is set in the space for the 3rd record specified by the cursor 80. The data related "GERMANY" is stored in the space which is additionally set by the procedure described above. Consequently, a memory area for one data record unit can be set in the position specified by the cursor, merely by operating the insert key 14, ensuring an imporoved efficiency in editing operation.

When the end key 16 is operated (S56), the merge file prepare processing is terminated (S57) so that the merge file is transmitted to and stored in the merge data memory 32 in RAM 30 (S58). When, for instance, the merge file shown in FIG. 12 has been prepared, the merge data is stored in the merge data memory 32 as shown in FIG. 15 in accordance with the file data and the each mark flag data within the data memory 61. Here, in accordance with each mark flag data, the identifier memory provided in the beginning of each record data accepts for storage a "41" identifier data when mark flag is set, and a "0" identifier data when the mark flag is reset. When a merge file shown in FIG. 13 has been prepared, a merge file shown in FIG. 16 is stored in the merge data memory 32 so that the data record unit erased from the CRT display 7 is also eliminated from the merge data memory 32. When a merge file shown in FIG. 14 has been prepared, a merge file shown in FIG. 17 is stored in the merge data memory 32 so that the new data record unit shown on the CRT display 7 is included in the merge data memory 32.

Repeating S20 through S59, all of the data record unit stored in the merge data memory 32 are classified by merge symbol into separate data to be displayed on the CRT display 7 in the form of table. In this state, the desired unit can be deleted by a simple operation. Likewise, a memory space for one data record unit can be provided at the desired position by an another simple operation.

Now, explanation is given for the merge print processing in S10 in accordance with the merge print control program, referring to FIG. 10.

In accordance with the merge file data stored in the merge data memory 32, the number of unit is stored in the unit quantity memory 33 (S61), with the unit counter 34 set to "1" (S62).

When the identifier data stored in the identifier memory for the data record unit specified by the unit counter 34 is "0" (S63), the value UC in unit counter 34 is incremented (S64), going to S63. In the merge data memory 32 shown in FIG. 15, for instance, the second record data unit is specified since the identifier data stored in the identifier memory for the 1st record data is "0". In case that the identifier data of the unit specified by the unit counter 34 is "1" (S63), the start address of the specified document file data is stored in the memory pointer 35 (S65) and if the value MP at the memory pointer 35 is not an end address (S66), the document data specified by the memory pointer 35 is read out (S77). If the data is not a merge symbol (S68), print processing is executed (S69), with the value MP of memory pointer 35 being incremented (S70), going back to S66.

In case that a merge symbol is read out (S68), a merge data corresponding to the read merge symbol out of the data record unit specified by the unit counter 34 is read out for printing (S71), so that the value MP in memory pointer 35 is incremented (S70), going back to S66.

When printing the document data is completed (S66), in case that all of the record data stored in the merge data memory 32 have not been printed (S72), the platen drive motor is driven to discharge the print paper on which the document data has been printed (S73) and an automatic paper feed mechanism (not shown) sends another piece of printer paper from the paper feed unit (S74), starting printing the document data again by repeating S63 and subsequent steps after S64. As shown in FIG. 18(A), for instance, merge printing the document data is executed in accordance with the document data shown in FIG. 11 and the first record data in the merge file shown in FIG. 15.

Merge printing is then executed sequentially for the data record unit specified by the identifier mark "1", returning to S2 till S72 gives an answer "Yes". As shown in FIGS. 18(A) to (C), for instance, the three record data stored in the merge data memory 32 and specified by the identifier mark "1" is subject to merge print processing in accordance with the merge file shown in FIG. 15.

As fully described above, the data record unit already having been selected for merge printing is marked with an asterisk * in accordance with the identifier data stored in the identifier memory provided in each data record unit. Therefore, there is no need of re-selecting the data record unit to be merge-printed when the unit to be merge-printed is the same as the previous one. When changing a data record unit to be merge-printed, whether the unit should be merged-printed is to be determined only for the unit to be changed, resulting in a simplified operation of unit selection for merge printing.

Every time the cursor 80 is moved to the identifier mark display area 83 and the space key 12 is operated, the asterisk * is displayed or erased (S41 through S45) to select whether or not merge print should take place. This facilitates accurate selection of a data record unit to be merge-printed.

The identifier memory for each data record unit can be provided at a desired position other than the beginning of the data record unit.

Further, when multiple data record unit stored in the merge data memory are classified by merge symbol and tabulated to a table for each unit are presented on the CRT display 7 (S20–S46), the data record unit specified by the cursor as a whole is erased from the CRT display and also eliminated from the merge data memory, resulting in the largely reduced number of key operation for deletion of data record unit and therefore in an improved efficiency in editing operation. Furthermore, by operating the insert key 14, memory space for a data record unit is additionally located just ahead of the unit specified by the cursor 80, while at the same time, a memory area is provided in the merge data memory 32 to store an additional data record unit, so that a memory area for data record unit can be given at a desired position by simple operation, again resulting in an improved efficiency in editing operation.

It would be readily understood that the invention is applicable to other similar document processing devices with a merge function such as word processors.

What is claimed is:

1. A document processing device comprising inputting means for inputting character codes and function codes, display means for displaying character data corresponding to the character codes, designating means for designating a point at which a character data is inputted on said display means, first memory means for storing a document file of data corresponding to the inputted codes, merge symbol inserting means for inserting a predetermined symbol data in said document file as a merge symbol, merge symbol number setting means for setting and storing a number of merge symbols being inserted in said document file, said document processing device further comprising:

second memory means for storing a plurality of data record units, each of said data record units including memory areas and each of said memory areas corresponding to each number of said merge symbols; 'display control means for displaying the contents of said second memory means on said display means with said each number corresponding to each memory area;

means for assigning a predetermined code to each desired record unit;

erasing means for erasing said predetermined code; and print control means for printing the contents of said document file in such a fashion that each merge symbol inserted in said document file is respectively substituted by the data stored in said memory areas of each data record unit to which said predetermined code is assigned by said assigning means.

2. The document processsing device according to claim 1 further including means for varying the capacity of each memory area included in the data record unit and the total capacity of the data record unit is constant.

3. The document processing device according to claim 1 wherein said assigning means assigns said predetermined code to the beginning of the data record unit to which said predetermined code is assigned.

4. The document processing device according to claim 1 wherein said assigning means and said erasing means respectively comprise keys for inputting certain function codes.

5. A document processing device comprising inputting means for inputting character codes and function codes, display means for displaying character data corresponding to the character codes, designating means for designating a point at which a character data is inputted on said display means, first memory means for storing a document file of data corresponding to the inputted codes, merge symbol inserting means for inserting a predetermined symbol data in said document file as a merge symbol, merge symbol number setting means for setting and storing a of said merge symbols being inserted in said document file, said document processing device further comprising:

second memory means for storing a plurality of data record units, each of said data record units including memory areas and each of said memory areas corresponding to each number of said merge symbols;

display control means for displaying the contents of said second memory means on said display means;

selecting means for selecting one of said data record units if the contents of said second memory means are displayed on said display means;

memory control means for deleting the data stored in the data record unit selected by said selecting means when a first predetermined code is inputted, while inserting an additional data record unit between the data record unit selected by said selecting means and the data record unit arranged just above said selected one when a second predetermined code is inputted; and print control means for printing the contents of said document file in such a fashion that each merge symbol inserted in said document file is respectively substituted by the data stored in said memory areas of each data record unit.

6. The document processing device according to claim 5 wherein said display control means further displays and stores a number corresponding to a memory area at which said designating means is located if a number of said memory area is larger than a maximum number corresponding to a memory area on which said designating means has been located.

7. The document processing device according to claim 5 wherein said display control means further erases a displayed number from said display means and displays and stores a number corresponding to a memory area at which said designating means is located if said number is prior to said erased number and no data exists in the memory area corresponding to said erased number.

8. The document processing device according to claim 5 which further comprises means for sounding an alarm in case that the number set by said merge symbol number setting means is larger than the number of memory area in said second memory means.

9. The document processing device according to claim 5 further including means for varying the capacity of each memory area included in the data record unit and the total capacity of the data record unit is constant.

10. The document processing device according to claim 5 wherein said memory control means shifts up the data stored in the data record unit following said selected data record unit on said display means when said first predetermined code is inputted and shifts down the data stored in the data record unit following said selected data record unit on said display means when said second predetermined code is inputted.

11. The document processing device according to claim 5 wherein said selecting means comprises a cursor being located at the beginning of the data record unit to be selected.

12. A document processing device comprising inputting means for inputting character codes and function codes, display means for displaying character data corresponding to the character codes, designating means for designating a point at which a character data is inputted on said display means, first memory means for storing a document file of data corresponding to the inputted codes merge symbol inserting means for inserting a predetermined symbol data an arbitrary number of times which is less than a predetermined value in said document file as a merge symbol, merge symbol number setting means for setting and storing a number of merge symbols being inserted in said document file, said document processing device further comprising:

second memory means for storing a plurality of data record units, each of said data record units including memory areas whose number is identical with a predetermined value and each of said memory areas corresponding to each number merge symbol;

display control means for displaying the contents of said second memory means on said display means; and print control means for printing the contents of said document file a number of times corresponding to the number of data record units in such a fashion that each merge symbol inserted in said document file is respectively substituted by the data stored in said memory areas of each data record unit.

13. The document processing device according to claim 12 wherein said display control means further displays and stores a number corresponding to a memory area at which said designating means is located if a number of said memory area is larger than a maximum number corresponding to a memory area on which said designating means has been located.

14. The document processing device according to claim 12 wherein said display control means further erases a displayed number from said display means and displays and stores a number corresponding to a memory area at which said designating means is located if said number is prior to said erased number and no data exists in the memory area corresponding to said erased number.

15. A document processing device comprising inputting means for inputting character codes and function codes, display means for displaying character data corresponding to the character codes, designating means for designating a point at which a character data is inputted on said display means, first memory means for storing a document file of data corresponding to the inputted codes, merge symbol inserting means for inserting a predetermined symbol data in said document file as a merge symbol, merge symbol number setting means for setting and storing a number of merge symbols being inserted in said document file, said document processing device further comprising:

second memory means for storing a plurality of data record units, each of said data record units including memory areas and each of said memory areas corresponding to each number of merge symbols;

display control means for displaying the contents of said second memory means on said display means with said each number corresponding to each memory area;

means for assigning a predetermined code to each desired record unit;

erasing means for erasing said predetermined code assigned by said assigning means;

selecting means for selecting one of said data record units if the contents of said second memory means are displayed on said display means;

memory control means for deleting the data stored in the data record unit selected by said selecting means when a first predetermined code is inputted, while inserting an additional data record unit between the data record unit selected by said selecting means and the data record unit arranged just above said selected one when a second predetermined code is inputted; and print control means for printing the contents of said document file in such a fashion that each merge symbol inserted in said document file is respectively substituted by the data stored in said memory areas of each data record unit to which said predetermined code is assigned by said assigning means.

* * * * *